May 25, 1965  V. MANGULIS  3,185,993
MULTI-DIRECTIONAL RADIO FREQUENCY ELECTRO-MAGNETIC
ENERGY DEFLECTOR
Original Filed Dec. 23, 1958
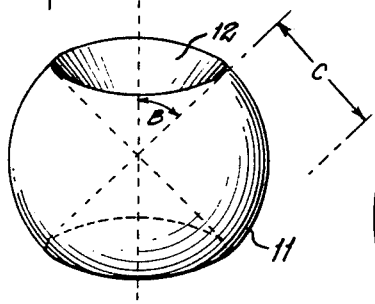
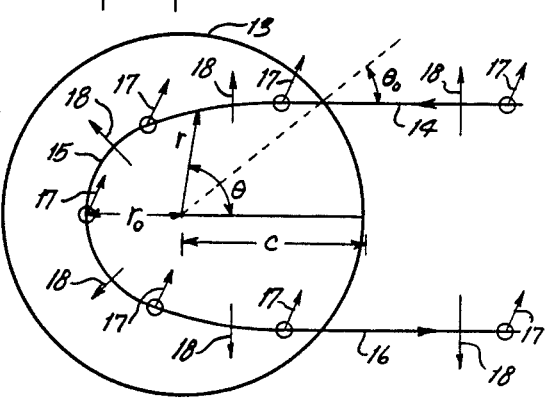
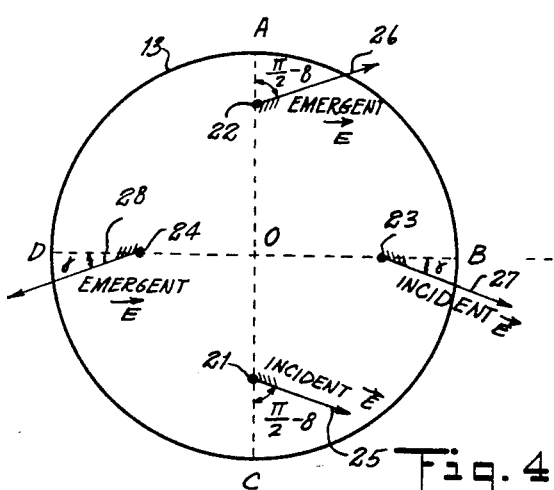
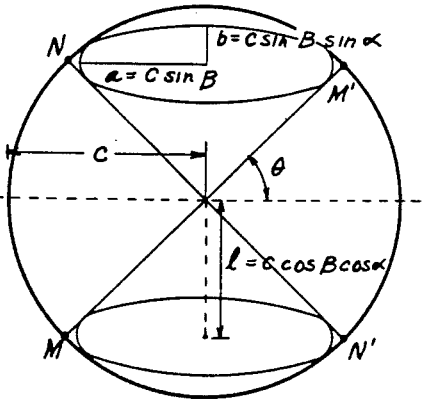
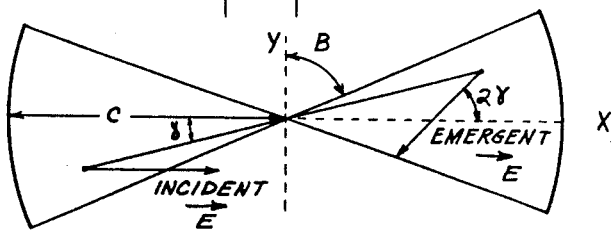
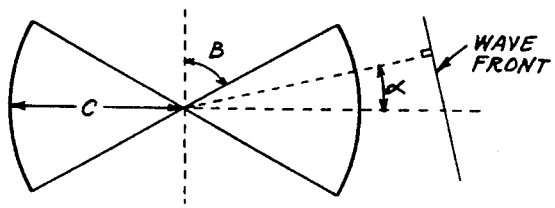
INVENTOR.
VISVALDIS MANGULIS
BY Darby & Darby
ATTORNEYS United States Patent Office 3,185,993
Patented May 25, 1965

3,185,993
MULTI-DIRECTIONAL RADIO FREQUENCY ELECTRO-MAGNETIC ENERGY DEFLECTOR
Visvaldis Mangulis, Brooklyn, N.Y., assignor, by mesne assignments, to Control Data Corporation, South Minneapolis, Minn., a corporation of Minnesota
Continuation of application Ser. No. 782,518, Dec. 23, 1958. This application Jan. 2, 1964, Ser. No. 337,976
11 Claims. (Cl. 343—911)

This application is a continuation of co-pending application Serial No. 782,518 for "Multi-Directional Radio Frequency Electromagnetic Energy Reflector" filed December 23, 1958, and now abandoned.

The present invention relates to retroflectors for radio frequency electromagnetic energy and particularly to such retroflectors which are multi-directional in the sense that energy incident on the retroflector is returned in a direction extending toward the source for a wide range of directions of incident energy relative to the reflector.

"Corner reflectors" have been commonly used as retroflectors for radar and similar signals where it is desired to provide a reflection from a reflector which is highly concentrated in the reverse direction from the impinging ray, or in other words, toward the source or effective sources of electromagnetic energy. Generally in the course of future discussion "retroflection" will be understood to mean such directional energy return unless otherwise indicated.

A common type of corner reflector comprises three mutually perpendicular plane plates of conductive material of generally rectangular shape joined in such a way that each plate is attached to each of the other plates along one of its four edges. Thus, there is formed a three dimensional corner from which comes the name "corner reflector." When rays impinge upon such a corner reflector from the front or concave side of the corner they tend to be reflected back in the direction of the source of radiation. Obviously, rays impinging from the backside of the corner, namely the convex side of the corner, will tend to be scattered and will not tend to be reflected. Of course, it will be seen that the corner reflector is not omni-directional and is in fact rather limited as to the multi-directionality of its reflection pattern. In fact, if rays of radiation lying only in a single plane are considered, the corner reflector is still not capable of reflecting rays from every direction or throughout 360 degrees. For this and other reasons the corner reflector is of limited usefulness and alternative types of retroflectors are desirable.

The present invention provides a retroflector which is multi-directional and may be constructed to be omni-directional at least for rays lying in a single plane. The retroflector comprises a body of generally spherical shape formed of a material or materials having an index of refraction for radio frequency energy which varies throughout the body of the sphere in a predetermined fashion, as will later be explained. The normal transmissivity of the spherical body is modified by the inclusion of portions having an absorptive character or other character which alters transmission through the body from its normal character. These portions are so arranged as to prevent the transmission of radiation through certain portions of the body which would interfere with and cause the cancellation of waves of energy from other portions of the body as will later be explained.

It is accordingly an object of the present invention to provide a retroflector for radio frequency electromagnetic energy which deflects incident energy back in a direction substantially toward its source.

It is another object of the present invention to provide such a retroflector which is effective for incident energy from any direction in at least one particular plane.

It is a further object of the present invention to provide such a retroflector wherein a high proportion of the incident radio frequency electromagnetic energy is deflected in the desired direction.

It is a still further object of the present invention to provide such a retroflector which is simple and relatively easy to produce and which has further advantages of light weight, compactness and insensivity to electrical, mechanical or other disturbances.

Other objects and advantages will be apparent from a consideration of the appended drawings in which:

FIGURE 1 is a perspective view of a retroflector according to the present invention.

FIGURE 2 is a diagram showing the theoretical path of a ray through a structure similar to that of the present invention presented to aid in the explanation of the invention.

FIGURE 3 is a diagram showing the polarization and phase relationships of incident and emergent rays in a spherical retroflector structure as known in the prior art and presented to aid in the explanation of the advantages of the present invention over the structures of the prior art.

FIGURE 4 is a diagram which together with the mathematical presentation later set forth serves to explain the theoretical operation of the present invention.

FIGURES 5 and 6 are diagrammatical representations of a retroflector according to the present invention presented (in conjunction with a mathematical analysis to be later set forth) for the purpose of explaining the degree to which a particular form of the retroflector is effective for rays of electromagnetic energy displaced by a given angle from a primary plane of reflection of the retroflector.

Referring now to the drawings, FIGURE 1 shows a perspective view of a retroflector structure 11 in accordance with the present invention. Retroflector structure 11 is generally spherical in shape with two cones of vertex angles $\beta$ removed in such a way that the vertices of the cones are at the center of the sphere, and the cones have a common axis. For simplicity, the common axis of the cones is shown oriented normal to the horizontal plane in FIGURE 1.

The index of refraction of the material of which the retroflector is formed varies through the body of the retroflector in accordance with a particular relationship. Suitable materials are available which have substantially the same index of refraction over a wide range of wavelengths. Therefore, a wide range of wavelengths of electromagnetic radiation may be utilized with the same retroflector, if desired.

The index of refraction of the material in the retroflector structure is related to the position of the material in the retroflector structure as follows:

Where $n$ is the index of refraction, $c$ is the radius of the sphere and $r$ is the radial distance of the material from the center of the sphere.

(1) $$n^2 = \frac{2c}{r} - 1$$

Retroflectors have been proposed and constructed wherein the refractive index of the material varied with position in the sphere in accordance with the foregoing relationship. However, such retroflectors have been virtually useless due to the fact that they were not properly designed to take into account all the factors involved in the construction of a microwave retroflector. An understanding of the present invention will best be achieved by a consideration of previous attempts at the construction of a spherical retroflector structure wherein the energy is directed solely by the phenomenon of refraction.

Referring now to FIGURE 2, a spherical lens 13 is shown upon which is incident a ray of radio frequency electromagnetic energy indicated at 14. If the index of refraction of material comprising the lens 13 is proportioned in accordance with Equation 1 the ray 14 will follow an arcuate path indicated at 15 and emerge as an emergent ray indicated at 16. In FIGURE 2, the path followed by the ray in the spherical lens lies in a plane through the center of the sphere. It can be shown that an incident ray will be refracted in such a way that it will always lie wholly within such a plane.

It should be noted that when "refraction angle" or when "deflection angle" is referred to in this explanation or in the claims, it should be interpreted to mean the total angle which is a measure of the total bending of the emergent ray with respect to the incident ray. In the usual case this will be the sum of numerous smaller refraction angles (at respective interfaces as the term refraction is generally used).

From the above discussion of FIGURE 2, it would appear upon preliminary consideration that a spherical body of the type shown in FIGURE 2 would be effective to return substantially all of the electromagnetic radiation of a particular wavelength or wavelength range back toward its source. Experiments have shown, however, that this is not the case and that a spherical deflector of this type is very ineffective.

The reason for the ineffectiveness of the spherical retroflector may be understood by a consideration of the effect of the polarization of the radio frequency or light rays of electromagnetic energy in the analysis of the operation of the device.

The phase and/or polarization of radio frequency or light rays of electromagnetic energy passing through the spherical body may be altered, depending upon the angular relationship between the plane of polarization of the ray and the plane of curvature of the ray. A simple illustration of this effect is shown in FIGURE 2. Consider the arrows 17 to represent the polarization direction and phase of the incident ray 14. Each arrow 17 is considered to be directed perpendicularly upward from the surface of the paper. A ray polarized and phased in such a manner emerges at 16 unchanged in polarization and phase. This conforms with what would be expected from a consideration of the physical representation of FIGURE 2.

If, on the other hand, ray 14 is considered to be polarized and phased in the direction indicated by arrows 18, upon emerging at 16 the ray will have experienced a reversal in phase. This, too, conforms to the physical representation in FIGURE 2.

To understand the results of this change in polarization or phase, it is useful to consider FIGURE 3. In FIGURE 3 there is shown the outline of a spherical retroflector 13 corresponding to that shown in FIGURE 2. In FIGURE 3, however, the incident and emergent rays are perpendicular to the surface of the paper and are represented by the dots 21, 22, 23 and 24. The arrows 25, 26, 27 and 28 represent the polarization and phase of the respective rays 21–24.

In FIGURE 3 a more general case is illustrated where the polarization vectors are not parallel to or perpendicular to the plane of curvature of the rays, but are rather at some angle lying between these two extremes. As would be expected, however, the polarization of the rays are altered by passage through the spherical body 13 by a degree that bears an inverse relation with the angle between the polarization vector and the plane of curvature of the ray in passing through the spherical body.

This polarization shifting effect results in a cancellation of emergent rays due to interference between sets of emergent rays as will now be explained. Consider the incident ray 23 which emerges as an emergent ray at 24, experiencing in the process a certain rotation of the polarization vector 27 to produce a new polarization vector 28. There is another ray 21 incident upon the cross-section of the spherical body 13 at a corresponding point exactly 90° from the point of incidence of ray 23 which will produce an emergent ray 22 having a phase exactly opposite the emergent ray 24, assuming that the incident ray 21 had the same phase and polarization of incident ray 23.

It may thus be seen that the two rays 21 and 23 form a set each ray of which is rotated in polarization in passing through the spherical body 13 in such a way that their emergent rays are interfering and will cancel with little or no retroflection resulting from the spherical body 13.

It is obvious that all rays incident over the surface of the cross-section of the spherical body 13 may be divided into sets, so that for each incident ray there is another member of the set which is of opposite phase upon emergence from the body and thus cancels the first member of the set. Thus, it will be seen that what appears to be a highly desirable retroflector structure upon first consideration is actually ineffective when the effect of polarization shifts in the structure are taken into account.

This failing is remedied by the present invention which provides a means for eliminating one ray of each set (or at least a substantial portion of the sets) of interfering rays, thereby eliminating the interference and cancellation effect and obtaining an efficient retroflector structure.

Referring again to FIGURE 3, the present invention operates in such fashion that rays striking the cross-section of the spherical body 13 in two oppositely disposed 90° sectors of the circular cross-section are absorbed or otherwise prevented from emerging and cancelling with the opposite member of its particular set of rays. For example, rays in sector AOB and in sector COD may be so eliminated. It was previously explained that the two members of a set of interfering rays lie on radii of the cross-section of the spherical body, which are at 90° to one another; with the elimination of portions of the rays from sectors of the cross-section of the spherical body 13 as previously explained it is obvious that virtually all interfering sets of rays may be broken up by the elimination of one member of the set.

Obviously, sectors of other than 90° could be removed and, generally, if more than 90° were removed, the reflected cross-section of the retroflector would be reduced, while if less than 90° were removed some interference between rays of interfering sets would still take place, thus similarly reducing the efficiency of the retroflector. Nevertheless in many instances it may be practical or more desirable to remove sectors of the retroflector cross-section more or less than 90°.

It should further be noted that a portion of the cross-section may be removed having a shape other than a sector surrounded by two radii and the included portion of the perimeter of the circle. For example, only a portion near the periphery of the cross-section may be removed, or only a portion near the center of the cross-section may be removed, or some portion inbetween may be removed, leaving both the center and the periphery intact as a wave transmitting structure.

A particularly useful form of the invention is provided by removing cone-shaped portions of the retroflector body, as this provides the desired cross-section from any aspect perpendicular to the axis of the cones.

It will be apparent that other than conical or frustroconical portions may be removed; for example, flat triangular portions or tetrahedronal portions or portions of other shapes might be removed to produce particular desired effects.

Although the preferred form of the structure has been described as having generally spherical configuration, it is obvious that the invention could be adapted to other configurations, such as partial ellipsoidal configurations, partial polyhedronal configurations, or any other which might be desired for a particular application.

From the foregoing explanation, it will be understood that the retroflector of FIGURE 1 should ideally be constructed, so that the material, of which it is composed, has a dielectric constant which varies continuously with the position of the material with respect to the center of the sphere. At present there are no known techniques for fabricating a material having a continuously varying dielectric constant. It is possible, however, to approximate the desired condition by providing a stepped variation of dielectric constant which approximates the desired variation. For example, the structure of FIGURE 1 may be constructed from artificial dielectrics available from Emerson and Cuming, Inc., of Canton, Mass., under the trade names of "Eccofoam" and "Stycast Hi-K." The same techniques of construction may be used as are used by the aforementioned company to construct Luenberg lens, or the techniques described by E. M. Lipsey in "The Theory of an Omni-Directional Radar Reflector," 1958 Proceedings of the National Conference on Aeronautical Engineering, pages 296–300.

In addition to the simple explanation of the invention previously set forth, the invention can also be explained in more rigorous mathematical terms.

In computing the back-scattering pattern, the lens is replaced by a plane aperture as shown in FIGURE 4. At a large distance from the aperture in free space the electric field $\overline{E}_s$ is given by (2) $$\begin{cases} E_{s\theta} = \frac{jke^{-jkR}}{4R}(1+\cos\theta)(N_x \cos\phi + N_y \sin\phi) \\ E_{s\phi} = \frac{-jke^{-jkR}}{4R}(1-\cos\theta)(N_x \sin\phi - N_y \cos\phi) \end{cases}$$

where (3) $$\overline{N} = {}_A\overline{E}_r s \, jk(x \sin\theta + y \sin\theta \sin\phi)_{dS}$$

$\theta$, $\phi$, and R are spherical coordinates with origin at the center of the aperture,
center of the aperture,
$\overline{E}_r$ is the field distribution over A.
A is the area of the aperture with coordinates $x, y$.

For back-scattering $\theta = 0$. If the radiation incident on the lens is a plane wave polarized in the $x$-direction, with the normal to the wavefront perpendicular to the axis of the lens, the field distribution over the aperture plane is (see FIGURE 4):

(4) $$\begin{cases} E_{r_x} = \cos(\pi + 2\gamma) = -\cos 2\gamma \\ E_{r_y} = \sin(\pi + 2\gamma) = -\sin 2\gamma \end{cases}$$

provided no ray entering the cones is returned (the cones may be filled with some one of many well-known absorbing materials, for example Darkflex, described in Naval Research Laboratory Report 4137, April 30, 1953.

Let $N_{x_0}$ and $N_{y_0}$ be the $x$ and $y$ components of $\vec{N}$ for $\theta = 0$. From Equations 3 and 4

$$N_{x_0} = -\frac{c^2}{2}\left(\int_{-\left(\frac{\pi}{2}-\beta\right)}^{\frac{\pi}{2}-\beta} \cos 2\gamma \, d\gamma + \int_{\frac{\pi}{2}+\beta}^{\frac{3\pi}{2}-\beta} \cos 2\gamma \, d\gamma\right)$$

(5) $$N_{x_0} = -c^2 \sin 2\beta$$
$$N_{y_0} = 0$$

For a flat plate of the shape of FIGURE 4

$$N_{x_0} = -c^2(\pi - 2\beta)$$
$$N_{y_0} = 0$$

where $N_{x_0}$ is just the physical area A of the plate; thus the partially spherical lens returns a wave front as if it were a flat plate of area $c^2 \sin 2\beta$. The cross section of a flat plate for radar scattering is defined as $$\sigma_{f_D} = \frac{4\pi A^2}{\lambda^2}$$

therefore, for the lens (6) $$\sigma = \frac{4\pi c^4 \sin^2 2\beta}{\lambda^2}$$

Consider a plane wave incident upon the lens at an angle $$\frac{\pi}{2} - \alpha$$

to the lens axis (see FIGURE 5). The projection of the lens upon a plane parallel to the wavefront corresponds to the aperture "seen" by the plane wave, as in FIGURE 6. The circles formed by the intersection of the sphere and the cones in the projection become ellipses with axes $a$ and $b$. If we draw tangents to the ellipses from the center of the circle, the two sectors of angles $2\phi$ between the tangents MM' and NN' form the part of the aperture which will return a ray parallel to itself; rays incident on the other two sectors at some time during their passage through the lens have to enter the cone.

The angle $\phi$ can be found from the geometry of FIGURE 4, (7) $$\tan\phi = \sqrt{\frac{l^2 - b^2}{a}} = \sqrt{\frac{\cos^2 \alpha}{\sin^2 \beta} - 1}$$

To find $N_{x_0}$ we must replace $2\beta$ in Equation 5 by $\pi - 2\phi$, which gives (8) $$N_{x_0} = -2c^2 \frac{\sin^2 \beta}{\cos^2 \alpha}\sqrt{\frac{\cos^2}{\sin^2 \beta} - 1}$$

and the cross section (9) $$\sigma = \frac{16\pi c^4}{\lambda^2} \cdot \frac{\sin^2 \beta}{\cos^2 \alpha}\left(1 - \frac{\sin^2 \beta}{\cos^2 \alpha}\right)$$

The factor $$4\frac{\sin^2 \beta}{\cos^2}\left(1 - \frac{\sin^2 \beta}{\cos^2 \alpha}\right)$$

is given in Tables I, II and II for $\beta = 45°$, $30°$, and $60°$ as a function of $\alpha$.

| Table I $\beta=45°$ | | Table II $\beta=30°$ | | Table III $\beta=60°$ | |
|---|---|---|---|---|---|
| $\alpha$ | $N^2_{x_0}/c^4$ | $\alpha$ | $N^2_{x_0}/c^4$ | $\alpha$ | $N^2_{x_0}/c^4$ |
| 0° | 1.000 | 0° | .750 | 0° | .750 |
| 10° | .999 | 10° | .765 | 10° | .701 |
| 20° | .982 | 20° | .812 | 20° | .512 |
| 30° | .889 | 30° | .889 | 25° | .317 |
| 40° | .504 | 40° | .978 | 28° | .146 |
| 43° | .244 | 50° | .956 | 30° | .000 |
| 45° | .00 | 55° | .730 | | |
| | | 58° | .391 | | |
| | | 60° | .000 | | |

Table IV.—*Theoretical db loss in back-scattering cross section because of non-use of material with $n > n_{max}$*

| $n_{max}$: | db Loss part. sph. lens |
|---|---|
| 2 | 8.9 |
| 3 | 3.7 |
| 4 | 2.0 |
| 5 | 1.3 |

From Equation 1, the index of refraction has to vary continuously from $n = 1$ at the surface of the lens till $n = \infty$ at the center. The effects on back-scattering of omitting the part of lens from which $n$ exceeds some $n_{max}$ are indicated in Table IV, giving the theoretical db loss in back-scattering cross-section because of elimination of material with $n$ exceeding $n_{max}$ for the partially spherical lens.

While up till now we have only considered radiation polarized in the x-direction, similar results obtain for radiation polarized in the y-direction, or circular polarization.

As can be seen from Tables I–III, the lens has also a very good vertical coverage. Corner reflectors can be placed in the removed cones to provide additional backscattering for high $\alpha$.

Some applications of the lens for the enhancement of the radar echo area are: mounting on commercial airplanes and towers and other obstacles near airports to prevent air collisions by easier detection by radar; placement on buoys for ship guidance; mounting on wheels of naval airplanes for aid in landing on aircraft carriers. It is obvious that many other applications for the retroflectors made in accordance with the present invention may be found by those skilled in the art and still further applications not apparent at the present time may arise from time to time.

It should be noted that while the chief applications for radar retroflectors generally require that the retroflector return a beam of energy substantially in the reverse direction from which it is received (at an angle of 180°), it is possible that in some applications it would be desired to return a beam or series of beams at some other angle other than 180° from the incident beam. Such an arrangement would obviously be within the purview of the present invention.

In addition to the various modifications and variations suggested to the particular retroflector apparatus shown and described, it is apparent that numerous other variations and modifications will be apparent to those of ordinary skill in the art and accordingly the present invention is not to be construed to be limited to those variations and modifications shown or suggested, but is to be limited solely by the appended claims.

What is claimed is:

1. A retroflector structure for electromagnetic energy comprising a spherical body of material having an index of refraction for said energy which is non-uniform and varies as a function of the position of the material, said function being selected to continuously refract an incident ray and turn it through an angle of approximately 180° at its point of emergence, said body having portions of altered transmission characteristics for said electromagnetic energy to prevent said continuous refraction of certain of said rays in said portions, said portions intercepting rays passing through a sector of at least one central cross-section of said body, said sector being angularly spaced by 90° from a part of said cross-section not containing such portion to prevent said continuous refraction of rays passing through said portions whereby part of rays impinging on said body of material are refracted through approximately 180°, and the remaining part of said impinging rays are intercepted by said portions to prevent their continuous refraction through approximately 180°, so that emergent rays so polarized as to interfere with other emergent rays are at least partly effectively eliminated.

2. Apparatus as claimed in claim 1 wherein said portions of altered transmission characteristics occupy a cone having its apex at the center of said body.

3. Apparatus as claimed in claim 1 wherein said portions of altered transmission characteristics comprise an absorbing medium.

4. Apparatus as claimed in claim 1, wherein said portions of altered transmission characteristics are symmetrically disposed with respect to one axis of said body.

5. Apparatus as claimed in claim 1, wherein said portions of altered transmission characteristics occupy two cones having a common axis and having their apexes at the center of said body.

6. A retroflector structure for electromagnetic energy comprising a spherical body of material having an index of refraction for said energy which is non-uniform and varies as a function of the position of the material approximately according to the following function:

$$n^2 = \frac{2c}{r} - 1$$

where $c$ is the radius of the sphere, $r$ is the radial distance from the center of the sphere, and $n$ is the index of refraction, said body having portions of altered transmission characteristics for said electromagnetic energy to prevent said continuous refraction of certain of said rays in said portions, said portions intercepting rays passing through a sector of at least one central cross-section of said body, said sector being angularly spaced by 90° from a part of said cross-section not containing such portions, whereby part of rays impinging on said body of material are refracted through approximately 180°, and the remaining part of said impinging rays are intercepted by said portions to prevent their continuous refraction through approximately 180°, so that emergent rays so polarized as to interfere with other emergent rays are at least partly effectively eliminated.

7. Apparatus as claimed in claim 6 wherein said portions of altered transmission characteristics occupy a cone having its apex at the center of said body.

8. Apparatus as claimed in claim 6 wherein said portions of altered transmission characteristics comprise an absorbing medium.

9. Apparatus as claimed in claim 6, wherein said portions of altered transmission characteristics are symmetrically disposed with respect to one axis of said body.

10. Apparatus as claimed in claim 6, wherein said portions of altered transmission characteristics occupy two cones having a common axis and having their apexes at the center of said body.

11. Apparatus as claimed in claim 6, wherein said portions of altered transmission characteristics are bounded by surfaces of revolution having as an axis one diameter of said spherical body.

References Cited by the Examiner

UNITED STATES PATENTS

| | | | |
|---|---|---|---|
| 2,835,891 | 5/58 | Peeler et al. | 343—911 |
| 2,990,545 | 6/61 | Bowman | 343—755 |

OTHER REFERENCES

Kelleher: "Designing Dielectric Microwave Lenses," Electronics, June 1956, pages 138–142.

Lipsey, E. M.: "Theory of an Omni-Directional Radar Reflector," pages 296–300 of Nat. Conf. on Aeronautical Engineering, Proceedings 1958.

HERMAN KARL SAALBACH, Primary Examiner.